US012803269B2

(12) United States Patent
Buescher et al.

(10) Patent No.: US 12,803,269 B2
(45) Date of Patent: Nov. 17, 2026

(54) ADAPTIVE UNDERVOLTAGE PROTECTION FOR THREE-PHASE LOAD USING SINGLE CURRENT SENSOR

(71) Applicant: Copeland Comfort Control LP, St. Louis, MO (US)

(72) Inventors: Thomas P. Buescher, Webster Groves, MO (US); Harshal Manik Pawar, Pune (IN)

(73) Assignee: Copeland Comfort Control LP, St. Louis, MO (US)

( * ) Notice: Subject to any disclaimer, the term of this patent is extended or adjusted under 35 U.S.C. 154(b) by 429 days.

(21) Appl. No.: 18/529,297

(22) Filed: Dec. 5, 2023

(65) Prior Publication Data

US 2025/0183652 A1 Jun. 5, 2025

Related U.S. Application Data

(63) Continuation-in-part of application No. 18/077,089, filed on Dec. 7, 2022, now Pat. No. 12,241,935.

(Continued)

(51) Int. Cl.
*H02P 29/10* (2016.01)
*H02H 1/00* (2006.01)

(Continued)

(52) U.S. Cl.
CPC ........ *H02H 7/0827* (2013.01); *H02H 1/0007* (2013.01); *H02H 3/253* (2013.01)

(58) Field of Classification Search
CPC ........ H02H 3/08; H02H 1/0007; H02H 3/006; H02H 3/085; H02H 5/041; H02H 7/08;

(Continued)

(56) References Cited

U.S. PATENT DOCUMENTS 6,615,594 B2 9/2003 Jayanth et al.
6,745,584 B2 6/2004 Pham et al.

(Continued)

OTHER PUBLICATIONS

SureSwitch™ Mul-Volt Contactor, www.emerson.com/white-rodgers.com; Copyright 2021; 8 pages.

(Continued)

*Primary Examiner* — Kawing Chan
*Assistant Examiner* — Charles S Laughlin
(74) *Attorney, Agent, or Firm* — Harness, Dickey & Pierce, P.L.C.; Anthony G. Fussner

(57) ABSTRACT

Exemplary embodiments are disclosed of a relay control or contactor configured to provide adaptive undervoltage protection for a three-phase load using a single current sensor. The current sensor is electrically connected with a corresponding one of a first, second, or third relay for providing information about current from the corresponding relay to a load. The information may be usable to determine a failure condition when: after the relays are energized, the information indicates that: there is no current across the corresponding one of the first, second, and third relays thereby indicating that the corresponding one of the first, second, and third relays is open and the load is running on two phases; or the current across the corresponding one of the first, second, and third relays is at lock rotor current for more than a determined amount of time indicating that the load is running on two phases.

26 Claims, 5 Drawing Sheets

Related U.S. Application Data

(60) Provisional application No. 63/431,991, filed on Dec. 12, 2022, provisional application No. 63/296,146, filed on Jan. 3, 2022.

(51) Int. Cl.
*H02H 3/253* (2006.01)
*H02H 7/08* (2006.01)
*H02P 9/30* (2006.01)

(58) Field of Classification Search
CPC ...... H02H 1/0061; H02H 1/0092; H02H 3/06; H02H 3/087; H02H 7/26; H02H 7/261; H02H 9/02; H02H 9/08; H02H 3/10; H02H 3/33
See application file for complete search history.

(56) References Cited

U.S. PATENT DOCUMENTS

| | | | | |
|---|---|---|---|---|
| 7,032,397 | B1 | 4/2006 | Mueller et al. | |
| 7,298,148 | B2 | 11/2007 | Drake et al. | |
| 7,672,095 | B2 | 3/2010 | Drake et al. | |
| 7,752,853 | B2 | 7/2010 | Singh et al. | |
| D696,208 | S | 12/2013 | Ling et al. | |
| D699,688 | S | 2/2014 | Ling et al. | |
| 10,209,751 | B2 | 2/2019 | Zikes et al. | |
| 2017/0047869 | A1* | 2/2017 | Edwards | H02P 1/00 |
| 2017/0331271 | A1* | 11/2017 | Pedrotti | H02K 11/27 |
| 2020/0080740 | A1 | 3/2020 | Broker | |
| 2021/0066908 | A1* | 3/2021 | Simms | H02H 7/0822 |
| 2021/0098207 | A1* | 4/2021 | Elmiger | H02H 9/002 |
| 2023/0213582 | A1 | 7/2023 | Buescher | |

OTHER PUBLICATIONS

ICM450A & ICM450A Plus+ Programmable 3-Phase Line Voltage Monitors; www.icmcontrols.com; accessed Dec. 12, 2022, 2 pages.
Non-final Office Action for U.S. Appl. No. 18/077,089 that names one of the same inventors and the same assignee as the instant application; dated Dec. 27, 2024; 9 pages.

* cited by examiner

200

ADAPTIVE UNDERVOLTAGE PROTECTION FOR THREE-PHASE LOAD USING SINGLE CURRENT SENSOR

CROSS-REFERENCE TO RELATED APPLICATIONS

This application claims the benefit of and priority to U.S. Provisional Application Ser. No. 63/431,991 filed Dec. 12, 2022.

This application is a continuation-in-part of U.S. patent application Ser. No. 18/077,089 filed Dec. 7, 2022, which published as US2023/0213582 on Jul. 6, 2023. U.S. patent application Ser. No. 18/077,089 claims the benefit of and priority to U.S. Provisional Application No. 63/296,146 filed Jan. 3, 2022.

The entire disclosures of the above patent applications are incorporated herein by reference.

FIELD

The present disclosure relates to adaptive undervoltage protection for a three-phase load using a single current sensor.

BACKGROUND

This section provides background information related to the present disclosure which is not necessarily prior art.

Existing 3-phase voltage monitors will disconnect the load if the input voltage is below a set voltage threshold to prevent the compressor motor from stalling or running at elevated current levels, which may cause excessive heat buildup. And the excessive heat buildup may damage the compressor or cause the safety temperature limits to open.

DRAWINGS

The drawings described herein are for illustrative purposes only of selected embodiments and not all possible implementations and are not intended to limit the scope of the present disclosure.

Corresponding reference numerals may indicate corresponding (though not necessarily identical) features throughout the several views of the drawings.

DETAILED DESCRIPTION

Example embodiments will now be described more fully with reference to the accompanying drawings.

Existing 3-phase voltage monitors will disconnect the load if the input voltage is below a set voltage threshold to prevent the compressor motor from stalling or running at elevated current levels, which may cause excessive heat buildup. And the excessive heat buildup may damage the compressor or cause the safety temperature limits to open. But as recognized herein, using a set voltage threshold could deny cooling even when the compressor is under a low load condition and capable of operating at the lower input voltage without stalling. In commercial refrigeration markets, a non-operational compressor or fan can result in spoiled food and lost sales.

As disclosed herein, exemplary embodiments are configured to be operable for providing adaptive undervoltage protection for a three-phase load (e.g., a compressor, other motor, other load, etc.) using only one current sensor (e.g., a single current transformer (isolated output), etc.). The single current sensor may be used on a three-phase system to indicate lock rotor current for an extended period, whereby motor stall is detectable based on the actual motor stall condition. In exemplary embodiments, using a current based method as disclosed herein can reduce the occurrence of system shutdowns when the conditions would otherwise allow the system to run normally.

Figure 1:
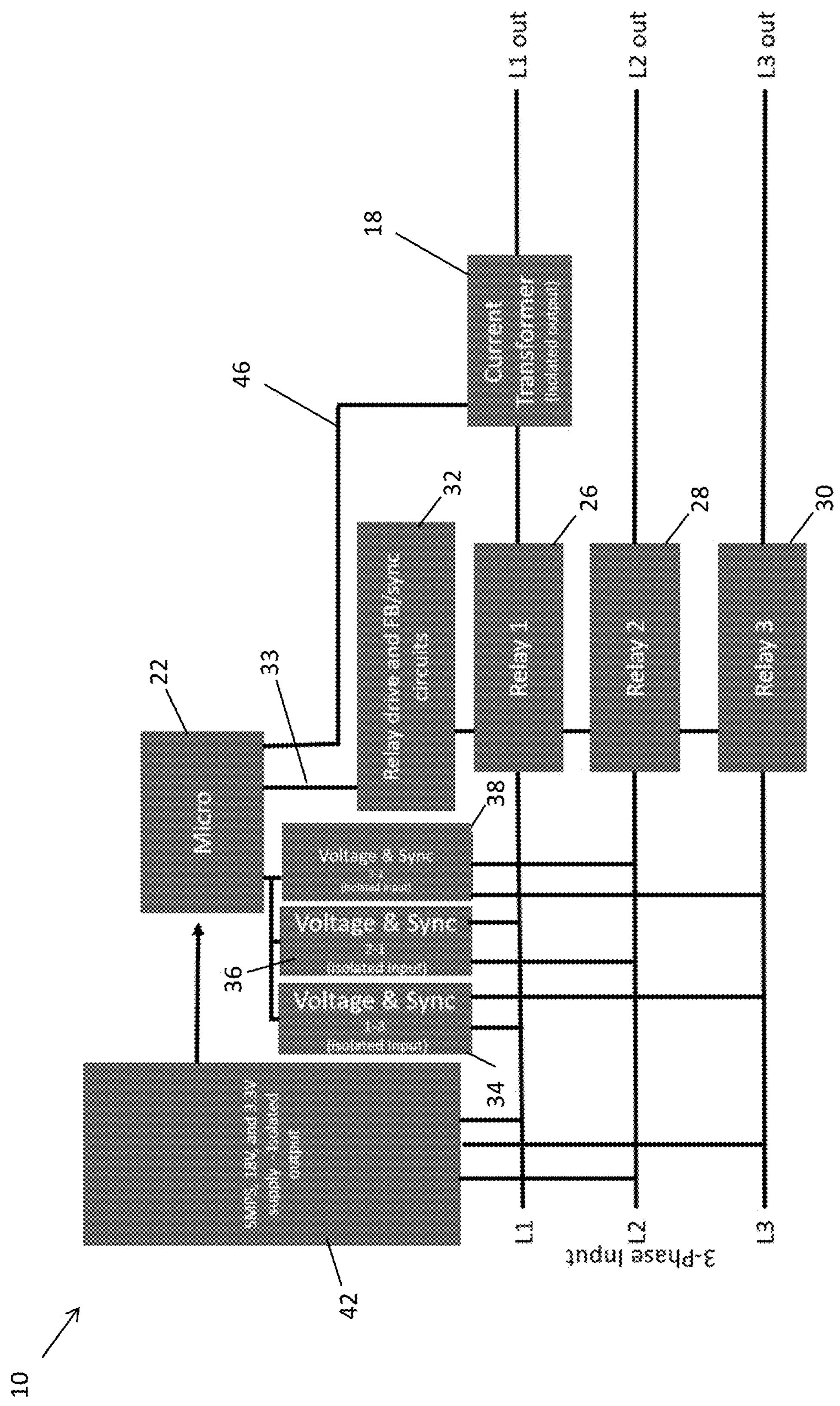
FIG. 1 is a diagram illustrating an exemplary embodiment of a relay control or contactor (broadly, a system) configured to provide adaptive undervoltage protection for a three-phase load using a single current sensor.

With reference to the figures, FIG. 1 illustrates an exemplary embodiment of a relay control or contactor 10 embodying one or more aspects of the present disclosure. The contactor 10 is configured to be operable for providing adaptive undervoltage protection for a 3-phase load L1, L2, L3 (e.g., for a compressor, motor, other load, etc.) using a single current sensor 18.

By way of example, the current sensor 18 may comprise a low resolution current sensor, current monitor, or current transformer having relatively low resolution circuitry that is sufficient for the relatively large differentials between no current, run current, and lock rotor current. In the illustrated embodiment shown in FIG. 1, the current sensor 18 comprises a current transformer having an isolated output to L1. The current transformer is electrically connected with the output L1 and a microcontroller 22 (broadly, a processor) and first relay 26 of the contactor 10.

Generally, the contactor 10 is electrically connected with or between the 3-phase input L1, L2, L3 and the 3-phase output L1, L2, L3 (e.g., voltage output for a compressor, motor, other load, etc.). By way of example, the contactor 10 may be electrically connected with the 3-phase input L1, L2, L3 via a circuit breaker (broadly, a voltage input from a line voltage source).

The contactor 10 may be electrically connected with a thermostat (broadly, a controller) of a climate control system (e.g., HVAC system, a cold chain system, etc.). For example, the microcontroller 22 of the contactor 10 may be coupled for communication with a thermostat such that the microcontroller 22 receives control signals from the thermostat via Y and C terminals. The microcontroller 22 may include a memory, e.g., a non-volatile electrically erasable programmable read-only memory (EEPROM), etc.

The contactor 10 includes first, second, and third relays 26, 28, and 30. The first, second, and third relays 26, 28, and 30 are electrically connected with or between the 3-phase inputs L1, L2, L3 and the 3-phase outputs L1, L2, L3. In addition, the first relay 26 is electrically connected with the second relay 28, which, in turn, is electrically connected with the third relay 30. Each relay 26, 28, and 30 may be substantially enclosed in a seal, e.g., a coating of epoxy glue, configured to prevent the intrusion, e.g., of insects and debris into contacts of the relays 26, 28, and 30, etc.

The contactor 10 includes a relay drive and feedback (FB)/synchronization circuit module 32 electrically connected with the first relay 26. And the first relay 26 is electrically connected with the second relay 28, which, in turn, is electrically connected with the third relay 30. The relay drive and FB/synchronization circuits 32 is in communication with the microcontroller 22 via communication path 33. Accordingly, the microcontroller 22 may independently switch the relays 26, 28, 30 ON or OFF via the relay drive and FB/synchronization circuits 32. For example, the microcontroller 22 may open the contacts of the relays 26, 28, 30 to electrically disconnect the 3-phase input L1, L2, L3 and a compressor motor (broadly, a load) that is connected with the 3-phase output L1, L2, L3. Or the microcontroller 22 may close the contacts of the relays 26, 28, and 30 to electrically connect the 3-phase input L1, L2, L3 with a compressor motor pressor via the 3-phase output L1, L2, L3. By way of example, the feedback (FB) may comprise an arc sensor or voltage across the contacts.

The contactor 10 includes first, second, and third voltage and synchronization components or modules 34, 36, 38. The first voltage and synchronization component or module 34 is electrically connected with the microcontroller 22, the first relay 26, and the third relay 30. The first voltage and synchronization component or module 34 is operable for providing synchronization (e.g., of voltage, frequency, phase rotation, phase angle, etc.) between the first relay 26 and the third relay 30. The second voltage and synchronization component or module 36 is electrically connected with the microcontroller 22, the second relay 28, and the first relay 26. The second voltage and synchronization component or module 36 is operable for providing synchronization (e.g., of voltage, frequency, phase rotation, phase angle, etc.) between the second relay 28 and the first relay 26. The third voltage and synchronization component or module 38 is electrically connected with the microcontroller 22, the third relay 30, and the second relay 28. The third voltage and synchronization component or module 38 is operable for providing synchronization (e.g., of voltage, frequency, phase rotation, phase angle, etc.) between the third relay 30 and the second relay 28. The goal of the isolated inputs 34, 36, and 38 is to monitor input voltage parameters and shut down for dropped phase or out of phase conditions.

Figure 4:
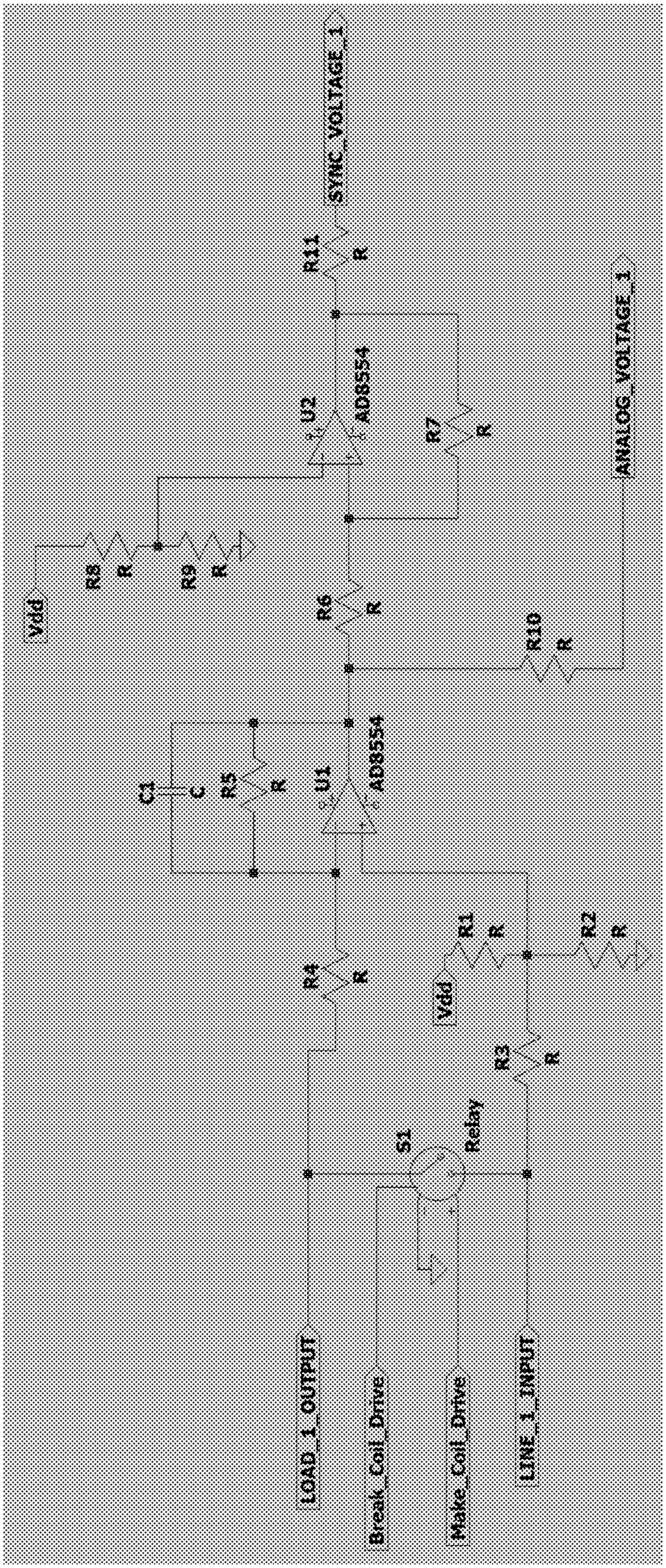
FIGS. 4 and 5 are circuit diagrams of example relay controls or contactors that may be configured to provide adaptive undervoltage protection for a three-phase load using a single current sensor according to exemplary embodiments.
Figure 5:
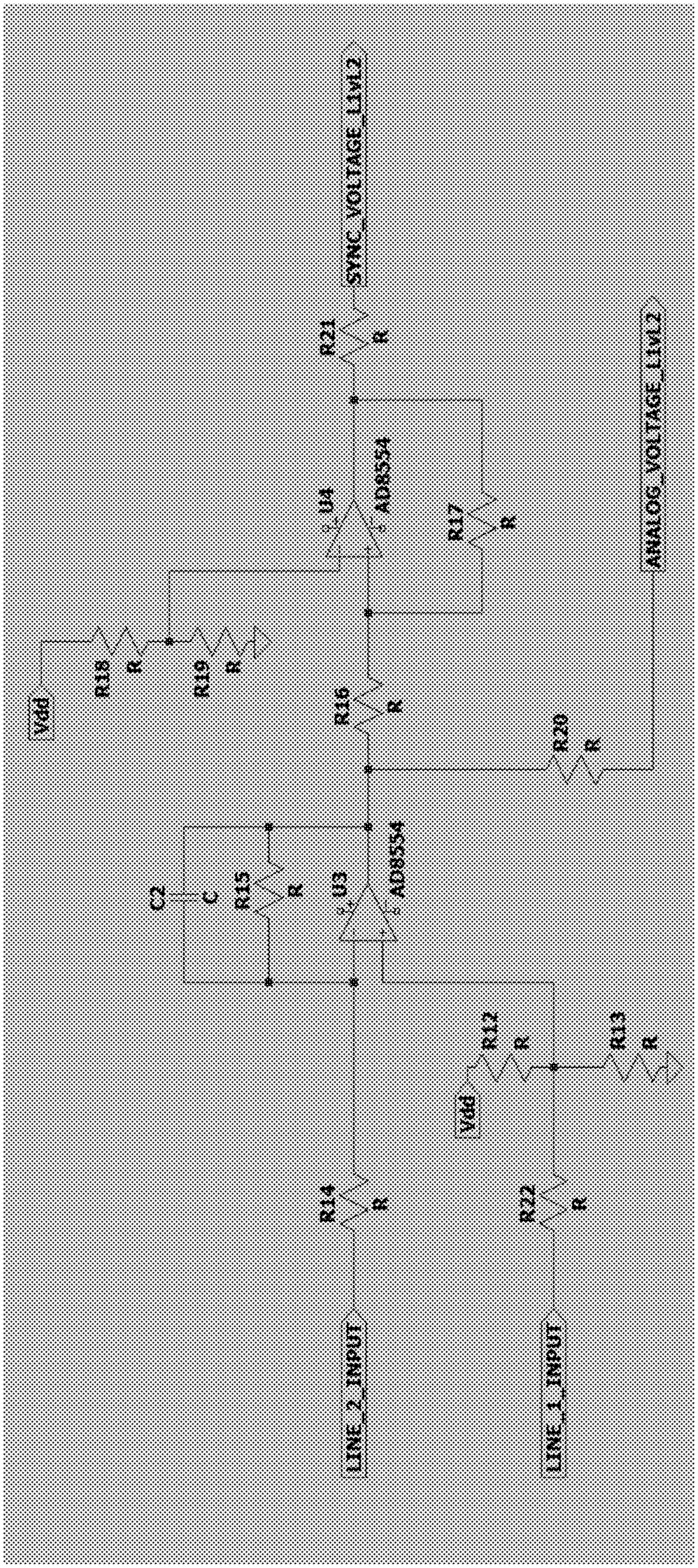

In addition, the first, second, and third voltage and synchronization components or modules 34, 36, 38 are also operable as input voltage monitors for monitoring input voltage into the respective first, second, and third relays 26, 28, 30. The microcontroller 22 receives the input voltages into the first, second, and third relays 26, 28, and 30 via the respective first, second, and third voltage and synchronization components or modules 34, 36, 38. By using the relay drive FB/sync circuits 32 in combination with the first, second, and third voltage and synchronization components or modules 34, 36, 38, the microcontroller 22 may be also be operable for detecting and measuring voltage across each relay 26, 28, 30 to determine whether or not the contacts of the relays are open or closed. By monitoring the input voltages, the contactor 10 can shut down for a lost phase voltage or low input voltage, or phase issues (not 60 hertz on a single phase or 120 hertz between phases). See also FIGS. 4 and 5 illustrating circuit diagrams of example relay controls or contactors that may be configured to provide adaptive undervoltage protection for a three-phase load using a single current sensor according to exemplary embodiments. The circuit shown in FIG. 4 includes eleven resistors (R1 to R11), a relay SI, two amplifiers U1 and U2, a capacity C1, and power supply voltages Vdd. The circuit shown in FIG. 5 includes eleven resistors (R12 to R22), two amplifiers U3 and U4, a capacity C2, and power supply voltages Vdd.

The 3-phase inputs L1, L2, L3 of the contactor 10 are electrically connected with a power supply 42. The power supply 42 drives the microcontroller 22 and all the circuits needed to measure the voltages. In the illustrated example shown in FIG. 1, the power supply 42 is identified as an SMPS (switched mode power supply), 18V, 3.3V supply-Isolated output. Alternative embodiments may include a differently configured power supply.

As noted above, the contactor 10 is configured to be operable for providing adaptive undervoltage protection for the 3-phase load L1, L2, L3 (e.g., for a compressor motor, other motor, other load, etc.) using only one current sensor 18. By way of example, the current sensor 18 may comprise a low resolution current sensor, current monitor, or current transformer having relatively low resolution circuitry that is sufficient for the relatively large differentials between no current, run current, and lock rotor current. In the illustrated embodiment shown in FIG. 1, the current sensor 18 comprises a current transformer having an isolated output electrically connected to L1. The current transformer is also electrically connected with the microcontroller 22 and the voltage output from the first relay 26.

The current sensor 18 is operable for monitoring the current between the first relay 26 and a compressor motor or other load connected with the output L1. The current sensor 18 is in communication with the microcontroller 22 via communication path 46. Accordingly, the microcontroller 22 receives feedback or information about the current between the first relay 26 and the compressor motor (or other load connected with the output L1) from the current sensor 18 via communication path 46. In turn, the microcontroller 22 may then use the feedback (FB) or information from the current sensor 18 to determine or detect lock rotor current for an extended period and motor stall based on the actual motor stall condition, thereby reducing the occurrence of system shutdowns when the conditions would otherwise allow the system to run normally. For example, a threshold of greater than 40% over typical fully loaded amps may be used to indicate a stall or potential stall condition. Or, for example, the microcontroller 22 may use the information from the current sensor 18 for determining whether there is a current across the first relay 26. If there is no current across the first relay 26, then the first relay 26 is open and the motor is only running on two phases and the motor should be shut down. If current is at lock rotor current for an amount of time (e.g., 3 to 4 times longer than typical, more than 10 seconds, other suitable time period, etc.), then the motor could be running on two phases and should be shut down.

By way of example, the contactor 10 may include one or more features of the relay switch control disclosed in U.S. Pat. No. 10,209,751 and/or U.S. Patent Application Publication US2023/0213582. The entire disclosures of U.S. Pat. No. 10,209,751 and U.S. Patent Application Publication US2023/0213582 are incorporated herein by reference.

Figure 2:
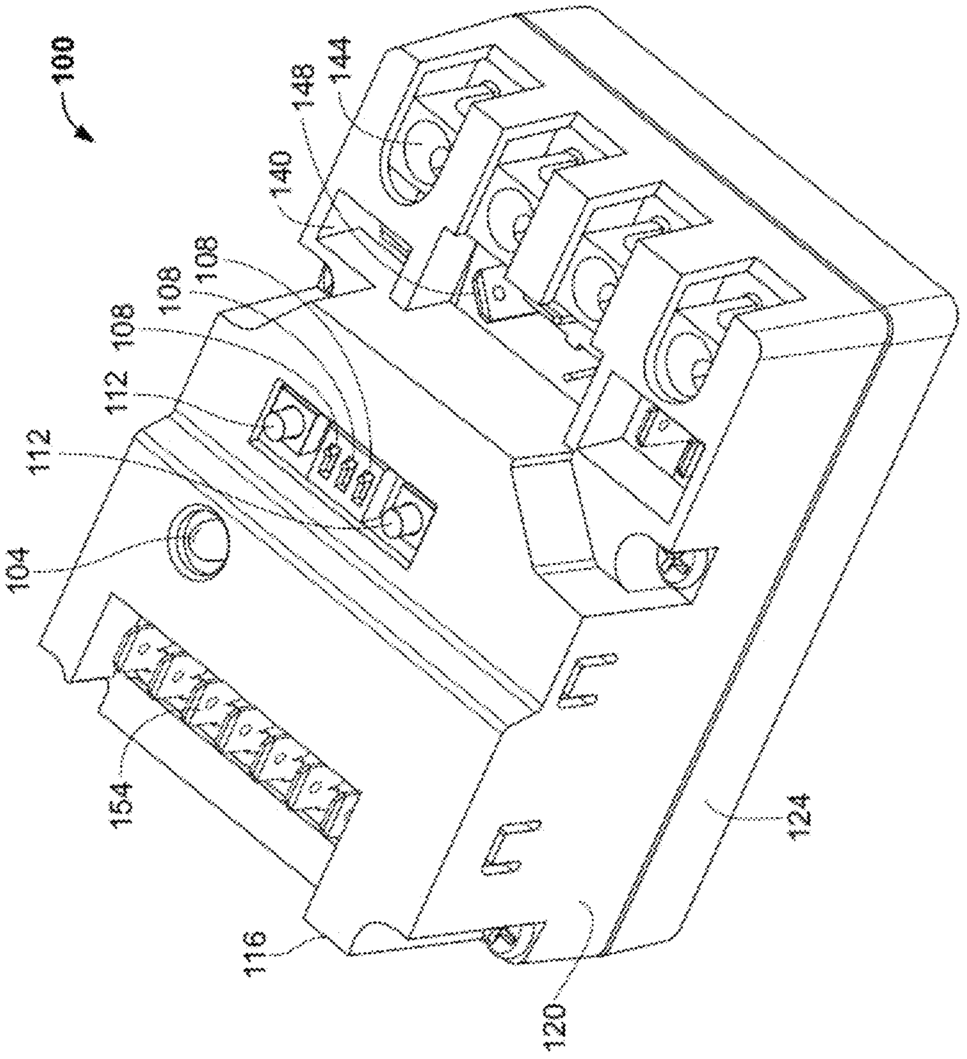
FIG. 2 is a perspective view of an example relay switch control that may include the system components shown in FIG. 1 for providing adaptive undervoltage protection for a three-phase load using a single current sensor according to an exemplary embodiment.
Figure 3:
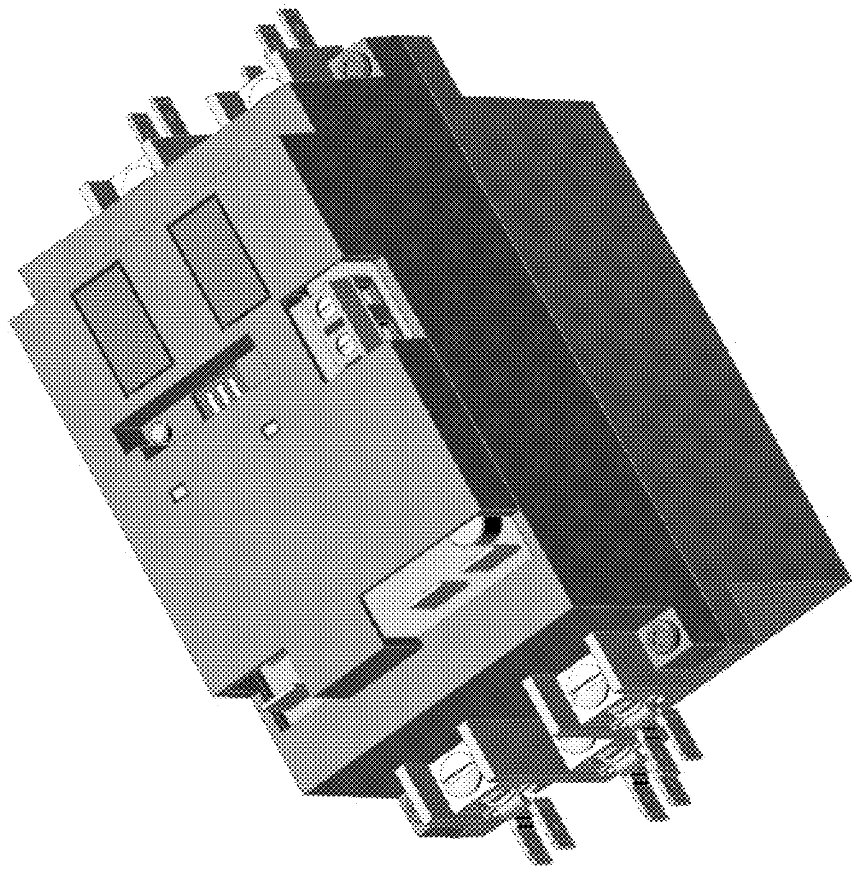
FIG. 3 is a perspective view of another example relay switch control that may include the system components shown in FIG. 1 for providing adaptive undervoltage protection for a three-phase load using a single current sensor according to an exemplary embodiment.

For example, the contactor 10 shown in FIG. 1 may comprise one or more features of the relay switch control 100 (broadly, a control) shown in FIG. 2. As another example, the contactor 10 shown in FIG. 1 may comprise one or more features of the relay switch control 200 (broadly, a control) shown in FIG. 3.

With reference back to FIG. 2, the example relay switch control 100 includes an indicator light 104, e.g., a multi-color LED, etc. The control 100 includes three dipswitches 108 and two push buttons 112.

The control 100 includes a two-piece housing 116, e.g., a two-piece plastic housing with integral mounting features. The two-piece housing 116 includes an upper housing portion or cover 120 and a lower housing portion 124. The microprocessor and three relays are provided beneath the upper cover 120 and so are not visible in FIG. 2. The housing 116 includes openings 140 in the upper housing portion or cover 120 for the terminal connections and connections to a compressor and a fan. Lug connectors 144 are provided for line voltage inputs and compressor outputs. Connectors 148 are provided for connection of compressor and fan capacitors, fan, etc. to line voltages (L1, L2).

The microprocessor and relays may be provided on a printed circuit board (PCB), which is horizontally situated relative to the housing bottom portion 124. But the PCB could be oriented in other directions, e.g., vertically within the housing in other relay switch control embodiments. Connectors 154 are provided on the PCB for connection of the control 100 with a thermostat (broadly, a controller).

The control 100 may be self-powered and/or may be configured with a power stealing feature in exemplary embodiments. In various embodiments, the control 100 may include its own 24 VAC power such that an installer is not required to pull additional wires to the outdoor unit.

In exemplary embodiments, a single current sensor is used to detect brownout. Typical brownout is based on a minimum voltage for worst case conditions. But in exemplary embodiments with a current input, the system could still operate below this voltage (below the typical brownout minimum voltage) by monitoring current and if the current increases significantly, or if start current lasts more than a fixed threshold, then the contactor is configured to shut off the load. This will allow for continued operation at low load or ideal temperature conditions.

For phase voltage imbalance, the current sensor can improve upon a voltage method in exemplary embodiments. For example, if the voltage differences between the phases are out of spec, the load can keep running as long as the unit is not drawing excessive current.

Exemplary embodiments are disclosed of a relay control or contactor (broadly, a system) configured to provide adaptive undervoltage protection for a three-phase load using a single current sensor. In exemplary embodiments, a contactor comprises a processor, first, second, and third relays, and a current sensor. The first, second, and third relays include respective first, second, and third relay contacts. The first, second, and third relays are configured to be operable by the processor to electrically connect or disconnect a load to or from a voltage input. The current sensor is electrically connected with a corresponding one of the first, second, and third relays. The current sensor is in communication with the processor for providing the processor with information about current from the corresponding one of the first, second, and third relays to the load. The processor is configured to determine a failure condition when: after the first, second, and third relays are energized, the information from the current sensor indicates that there is no current across the corresponding one of the first, second, and third relays thereby indicating that the corresponding one of the first, second, and third relays is open and the load is running on two phases; or after the first, second, and third relays are energized, the information from the current sensor indicates that the current across the corresponding one of the first, second, and third relays is at lock rotor current for more than a determined amount of time indicating that the load is running on two phases.

In exemplary embodiments, the contactor is configured such that the information from the current sensor enables the processor to determine a motor stall based on an actual motor stall condition.

In exemplary embodiments, the processor is configured to use a threshold of greater than 40% over typical fully loaded amps as indicative of a stall or potential stall condition.

In exemplary embodiments, the contactor includes only said current sensor that is electrically connected with only one of said first, second, and third relays.

In exemplary embodiments, the contactor includes only said current sensor that is electrically connected with said first relay for providing the processor with information about the current from the first relay to the load. And the processor is configured to determine a failure condition when the information from the current sensor indicates that there is no current across the first relay, and the load is running on two phases via the second and third relays.

In exemplary embodiments, the current sensor of the contactor comprises first, second, and third current sensors electrically connected with the respective first, second, and third relays And the first, second, and third current sensors are in communication with the processor for providing the processor with information about current from the first, second, and third relays to the load.

In exemplary embodiments, the current sensor is electrically connected with the respective first, second, and third relays. And the current sensor is operable for providing the processor with information about current from the first, second, and third relays to the load.

In exemplary embodiments, the current sensor of the contactor comprises at least two current sensors electrically connected with a corresponding two of the first, second, and third relays. And the at least two current sensors are in communication with the processor for providing the processor with information about current from the corresponding two of the first, second, and third relays to the load.

In exemplary embodiments, the processor is configured to determine a failure condition when the information from the current sensor indicates lock rotor current for more than ten seconds.

In exemplary embodiments, the processor is configured to determine a failure condition when the information from the current sensor indicates lock rotor current multiple times longer than the determined amount of time.

In exemplary embodiments, the first relay is electrically connected in series with the second relay. The second relay is electrically connected in series with the third relay.

In exemplary embodiments, the contactor includes relay drive and FB/synchronization circuit module electrically connected in series with the and the first relay. The first relay is electrically connected in series with the second relay. The second relay is electrically connected in series with the third relay. The processor is operable for independently switching the first, second, and third relays ON or OFF via the relay drive and FB/synchronization circuit module.

In exemplary embodiments, the contactor includes first, second, and third voltage and synchronization modules. The first voltage and synchronization module is also electrically connected with the processor, the first relay, and the third relay. The first voltage and synchronization module is operable for providing synchronization of voltage, frequency, phase rotation, and/or phase angle between the first relay and the third relay. The second voltage and synchronization module is electrically connected with the processor, the second relay, and the first relay. The second voltage and synchronization module is operable for providing synchronization of voltage, frequency, phase rotation, and/or phase angle between the second relay and the first relay. The third voltage and synchronization module is electrically connected with the processor, the third relay, and the second relay. The third voltage and synchronization module is operable for providing synchronization of voltage, frequency, phase rotation, and/or phase angle between the third relay and the second relay.

In exemplary embodiments, the contactor includes relay drive and FB/synchronization circuit module electrically connected in series with the and the first relay. The first relay is electrically connected in series with the second relay. The second relay is electrically connected in series with the third relay. The processor is operable for independently switching the first, second, and third relays ON or OFF via the relay drive and FB/synchronization circuit module.

In exemplary embodiments, the first, second, and third voltage and synchronization modules are operable as input voltage monitors for monitoring input voltage into the first, second, and third relays. The processor is operable for receiving the input voltages into the first, second, and third relays via the first, second, and third voltage and synchronization modules, which enables the processor to detect or measure voltage across the first, second, and third relays and determine whether or not the first, second, and third relay contacts are open or closed.

In exemplary embodiments, after the processor has determined a failure condition exists, the processor is configured to not energize the load until the contactor is reset.

In exemplary embodiments, after the processor has determined that a failure condition exists, the processor is configured to alert a system controller and/or a user about the failure condition.

In exemplary embodiments, the contactor includes at least one light source And the processor is configured to control operation of the at least one light source to illuminate and thereby generate an alert after the processor has determined that a failure condition exists.

In exemplary embodiments, the contactor is configured such that the information from the current sensor enables the processor to detect brownout. The contactor is configured to monitor current and allow continued operation below a brownout minimum voltage. The contactor is further configured to shut off the load if the monitored current increases significantly or if start current lasts more than a fixed threshold, then the contactor is configured to shut off the load.

In exemplary embodiments, a system comprises a controller in communication with a processor of a contactor as disclosed herein. The processor is configured to receive control signals from the controller. The first, second, and third relays are operable by the processor in response to control signals from the controller to electrically connect or disconnect the load to or from the voltage input received by the contactor from a line voltage source. After the processor has determined that a failure condition exists, the processor is configured to send an alert to the controller about the failure condition.

In exemplary embodiments, a system comprises a thermostat in communication with a processor of a contactor as disclosed herein. The system also comprises a compressor including a motor. The processor is configured to receive control signals from the thermostat. The first, second, and third relays are operable by the processor in response to control signals from the thermostat to electrically connect or disconnect the motor of the compressor to or from the voltage input received by the contactor from a line voltage source. After the processor has determined that a failure condition exists, the processor is configured to send an alert to the thermostat about the failure condition.

Also disclosed are exemplary methods of providing adaptive undervoltage protection for a three-phase load. In exemplary embodiments, a method comprises obtaining, via a current sensor, information about current from a corresponding one of a first, second, and third relay to a load. The method further comprises determining, via a processor, a failure condition when: after the first, second, and third relays are energized, the information from the current sensor indicates that there is no current across the corresponding one of the first, second, and third relays thereby indicating that the corresponding one of the first, second, and third relays is open and the load is running on two phases; or after the first, second, and third relays are energized, the information from the current sensor indicates that the current across the corresponding one of the first, second, and third relays is at lock rotor current for more than a determined amount of time indicating that the load is running on two phases.

In exemplary embodiments, the method incudes determining motor stall based on an actual motor stall condition.

In exemplary embodiments, the method incudes using a threshold of greater than 40% over typical fully loaded amps as an indicator of a stall or potential stall condition In exemplary embodiments, the method incudes using only said current sensor that is electrically connected with only one of said first, second, and third relays to thereby obtain the information about current from the corresponding one of the first, second, and third relay to the load.

In exemplary embodiments, the method incudes using only said current sensor that is electrically connected with said first relay to thereby obtain the information about current from the first relay to the load.

In exemplary embodiments, after determining, via a processor, a failure condition, the processor is configured to not energize the load until after resetting a contactor that includes the processor.

In exemplary embodiments, the method includes: using information from the current sensor to detect brownout; monitoring current and allowing continued operation below a brownout minimum voltage; and shutting off the load if the monitored current increases significantly or if start current lasts more than a fixed threshold.

Although various exemplary embodiments are described herein in relation to a compressor motor and a thermostat, the disclosure is not so limited. Various embodiments are contemplated in relation to various types of loads, including but not limited to motors, which may be switched through contactors and relay switch controls including relays having contacts. Embodiments of contactors and relay switch controls are also contemplated in relation to various types of systems, including but not limited to climate control systems, HVAC systems, cold chain systems, refrigeration systems, etc. Although the term “relay switch control” is used herein, it is contemplated that various types of controls, controllers, hardware, software, combinations thereof, etc. could be used. It also is contemplated that various types of processors, microprocessors, computers, etc. could be utilized in accordance with various implementations of the disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected, or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A contactor comprising:

a processor;

first, second, and third relays including respective first, second, and third relay contacts and configured to be operable by the processor to electrically connect or disconnect a load to or from a voltage input; and a single current sensor electrically connected with a corresponding one of the first, second, and third relays, the current sensor is in communication with the processor for providing the processor with information about current from the corresponding one of the first, second, and third relays to the load;

wherein the processor is configured to determine a failure condition using the information from the single current sensor; and wherein the processor is configured to determine the failure condition when:

after the first, second, and third relays are energized, the information from the current sensor indicates that there is no current across the corresponding one of the first, second, and third relays while voltage is present, thereby indicating that the corresponding one of the first, second, and third relays is open and the load is running on two phases; or after the first, second, and third relays are energized, the information from the current sensor indicates that the current across the corresponding one of the first, second, and third relays is at lock rotor current for more than a determined amount of time thereby indicating that the load is running on two phases;

whereby the processor is operable for determining that the load is operating on fewer than three phases without receiving current information from the other relays.

2. The contactor of claim 1, wherein the contactor is configured such that the information from the current sensor enables the processor to determine a motor stall based on an actual motor stall condition.

3. The contactor of claim 1, wherein the processor is configured to use a threshold of greater than 40% over typical fully loaded amps as indicative of a stall or potential stall condition.

4. The contactor of claim 1, wherein;

the contactor includes only said single current sensor that is electrically connected with only one of said first, second, and third relays and not electrically connected with the other relays;

the processor is configured to determine the failure condition using only the information from the single current sensor; and the processor is configured to determine that the load is operating on fewer than three phases using only the information from the single current sensor without receiving current information from the other relays.

5. The contactor of claim 1, wherein:

the contactor includes only said single current sensor that is electrically connected with said first relay for providing the processor with information about current from the first relay to the load; and the processor is configured to determine a failure condition when the information from the single current sensor indicates that there is no current across the first relay, and the load is running on two phases via the second and third relays.

6. The contactor of claim 1, wherein:

the contactor comprises first, second, and third current sensors electrically connected with the respective first, second, and third relays; and the first, second, and third current sensors are in communication with the processor for providing the processor with information about current from the first, second, and third relays to the load.

7. The contactor of claim 1, wherein the current sensor is electrically connected with the first, second, and third relays, whereby the current sensor is operable for providing the processor with information about current from the first, second, and third relays to the load.

8. The contactor of claim 1, wherein:

the contactor comprises at least two current sensors electrically connected with a corresponding two of the first, second, and third relays; and the at least two current sensors are in communication with the processor for providing the processor with information about current from the corresponding two of the first, second, and third relays to the load.

9. The contactor of claim 1, wherein the processor is configured to determine a failure condition when the information from the current sensor indicates lock rotor current for more than ten seconds.

10. The contactor of claim 1, wherein the processor is configured to determine a failure condition when the information from the current sensor indicates lock rotor current multiple times longer than the determined amount of time.

11. The contactor of claim 1, wherein:

the first relay is electrically connected in series with the second relay; and the second relay is electrically connected in series with the third relay.

12. The contactor of claim 1, wherein:

the contactor includes relay drive and feedback/synchronization circuit module electrically connected in series with the processor and the first relay;

the first relay is electrically connected in series with the second relay; and the second relay is electrically connected in series with the third relay;

whereby the processor is operable for independently switching the first, second, and third relays ON or OFF via the relay drive and feedback/synchronization circuit module.

13. The contactor of claim 1, wherein the contactor includes:

a first voltage and synchronization module electrically connected with the processor, the first relay, and the third relay, whereby the first voltage and synchronization module is operable for providing synchronization of voltage, frequency, phase rotation, and/or phase angle between the first relay and the third relay;

a second voltage and synchronization module electrically connected with the processor, the second relay, and the first relay, whereby the second voltage and synchronization module is operable for providing synchronization of voltage, frequency, phase rotation, and/or phase angle between the second relay and the first relay; and a third voltage and synchronization module electrically connected with the processor, the third relay, and the second relay, whereby the third voltage and synchronization module is operable for providing synchronization of voltage, frequency, phase rotation, and/or phase angle between the third relay and the second relay.

14. The contactor of claim 13, wherein:

the contactor includes relay drive and feedback/synchronization circuit module electrically connected in series with the processor and the first relay;

the first relay is electrically connected in series with the second relay; and the second relay is electrically connected in series with the third relay;

whereby the processor is operable for independently switching the first, second, and third relays ON or OFF via the relay drive and feedback/synchronization circuit module.

15. The contactor of claim 14, wherein:

the first, second, and third voltage and synchronization modules are operable as input voltage monitors for monitoring input voltage into the first, second, and third relays; and the processor is operable for receiving the input voltages into the first, second, and third relays via the first, second, and third voltage and synchronization modules, which enables the processor to detect or measure voltage across the first, second, and third relays and determine whether or not the first, second, and third relay contacts are open or closed.

16. The contactor of claim 1, wherein after the processor has determined a failure condition exists, the processor is configured to not energize the load until the contactor is reset.

17. The contactor of claim 1, wherein after the processor has determined that a failure condition exists, the processor is configured to alert a system controller and/or a user about the failure condition.

18. The contactor of claim 1, wherein:

the contactor includes at least one light source; and the processor is configured to control operation of the at least one light source to illuminate and thereby generate an alert after the processor has determined that a failure condition exists.

19. A system comprising a controller in communication with the processor of the contactor of claim 1, wherein:

the processor is configured to receive control signals from the controller;

the first, second, and third relays are operable by the processor in response to control signals from the controller to electrically connect or disconnect the load to or from the voltage input received by the contactor from a line voltage source; and after the processor has determined that a failure condition exists, the processor is configured to send an alert to the controller about the failure condition.

20. A system comprising a thermostat in communication with the processor of the contactor of claim 1, and a compressor including a motor, wherein:

the processor is configured to receive control signals from the thermostat;

the first, second, and third relays are operable by the processor in response to control signals from the thermostat to electrically connect or disconnect the motor of the compressor to or from the voltage input received by the contactor from a line voltage source; and after the processor has determined that a failure condition exists, the processor is configured to send an alert to the thermostat about the failure condition.

21. The contactor of claim 1, wherein the processor is configured to infer a phase loss condition in a phase that is not directly monitored by the current sensor based solely on current information from the one relay.

22. The contactor of claim 1, wherein:

the processor is configured to detect a brownout condition when an input voltage falls below a predetermined voltage threshold stored in memory;

the processor is configured to allow continued operation during the brownout condition when measured current remains within a normal operating range;

the processor determines that current increases significantly when the current exceeds at least 40% above a full load current value; and the processor determines that a start current condition persists when a current exceeding a start current threshold persists longer than a predetermined time interval of at least 10 seconds, and in response, the processor is configured to shut off the load.

23. A method of providing adaptive undervoltage protection for a three-phase load, the method comprising: obtaining, via a single current sensor, information about current from a corresponding one of a first, second, and third relay to a load; and determining, via a processor using information from the single current sensor, a failure condition when: after the first, second, and third relays are energized, the information from the current sensor indicates that there is no current across the corresponding one of the first, second, and third relays thereby indicating that the corresponding one of the first, second, and third relays is open and the load is running on two phases; or after the first, second, and third relays are energized, the information from the current sensor indicates that the current across the corresponding one of the first, second, and third relays is at lock rotor current for more than a determined amount of time indicating that the load is running on two phases wherein determining the failure condition includes determining that the load is operating on fewer than three phases without receiving current measurements from the other relays;

wherein after determining, via a processor, a failure condition, the processor is configured to shut off the load until after resetting a contactor that includes the processor.

24. The method of claim 23, wherein the method incudes determining motor stall based on an actual motor stall condition.

25. The method of claim 23, wherein the method incudes using a threshold of greater than 40% over typical fully loaded amps as an indicator of a stall or potential stall condition.

26. The method of claim 23, wherein the method includes:

using only said single current sensor that is electrically connected with only one of said first, second, and third relays to thereby obtain the information about current from the corresponding one of the first, second, and third relay to the load, the single current sensor not electrically connected with the other relays; and determining the failure condition via the the processor using only the information from the single current sensor.

* * * * *